(12) United States Patent
Baker et al.

(10) Patent No.: US 6,373,676 B1
(45) Date of Patent: Apr. 16, 2002

(54) MAGNETIC FLOATATION CONTROL SYSTEM

(75) Inventors: William Baker; John Robinson; Andrew Artimovich, all of Indianapolis, IN (US)

(73) Assignee: Span Inc., Indianapolis, IN (US)

( * ) Notice: Subject to any disclaimer, the term of this patent is extended or adjusted under 35 U.S.C. 154(b) by 0 days.

(21) Appl. No.: 09/411,564

(22) Filed: Oct. 1, 1999

Related U.S. Application Data
(60) Provisional application No. 60/103,137, filed on Oct. 5, 1998.

(51) Int. Cl.[7] ............................................. H01H 47/00
(52) U.S. Cl. ..................................................... 361/143
(58) Field of Search ................................. 361/143, 144, 361/146, 147; 310/90.5; 335/289–291, 295; 104/281–282, 284

(56) References Cited

U.S. PATENT DOCUMENTS

| | | | |
|---|---|---|---|
| 3,742,862 A | * 7/1973 | Gebhardt et al. | 361/143 |
| 3,849,724 A | * 11/1974 | Ghibu et al. | 361/143 |
| 4,585,282 A | * 4/1986 | Bosley | 308/10 |
| 4,623,202 A | * 11/1986 | Shingu | 310/90.5 |
| 4,652,805 A | * 3/1987 | Khon | 318/628 |
| 4,910,633 A | * 3/1990 | Quinn | 361/144 |
| 4,943,772 A | * 7/1990 | Maupu et al. | 324/207.2 |
| 5,040,410 A | * 8/1991 | Chu et al. | 73/54 |
| 5,267,091 A | * 11/1993 | Chen | 359/872 |
| 5,311,124 A | * 5/1994 | Hubbard et al. | 324/207.13 |
| 5,467,244 A | * 11/1995 | Jayawant et al. | 361/144 |
| 5,602,711 A | * 2/1997 | Curtis et al. | 361/139 |
| 5,677,821 A | * 10/1997 | Myr | 361/143 |
| 6,147,425 A | * 11/2000 | Ueyama et al. | 310/90.5 |
| 6,259,179 B1 | * 7/2001 | Fukuyama et al. | 310/90.5 |

FOREIGN PATENT DOCUMENTS

EP    WO 97/095-40    3/1997

* cited by examiner

Primary Examiner—Brian Sircus
Assistant Examiner—J. F. Duverne
(74) Attorney, Agent, or Firm—Haynes & Boone, LLP

(57) ABSTRACT

An improved system and method for floating an object is disclosed by the present invention. The system includes an electromagnetic source for accommodating a wide weight-range of objects to be floated and for providing intelligent, responsive control of the system. The electromagnetic source includes a single Hall effect sensor for sensing the position change of the floating object and a microprocessor for intelligently controlling the floating object so that a better, simpler, and more stable operation is achieved. With the implementation of the microprocessor, a user friendly interface for initially placing the object on the system is achieved, and no complicate adjustments of the system are required to float a new object.

26 Claims, 4 Drawing Sheets

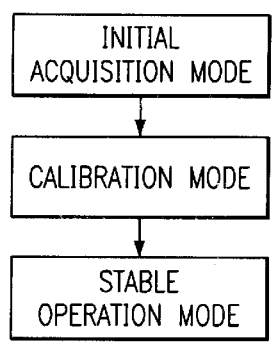
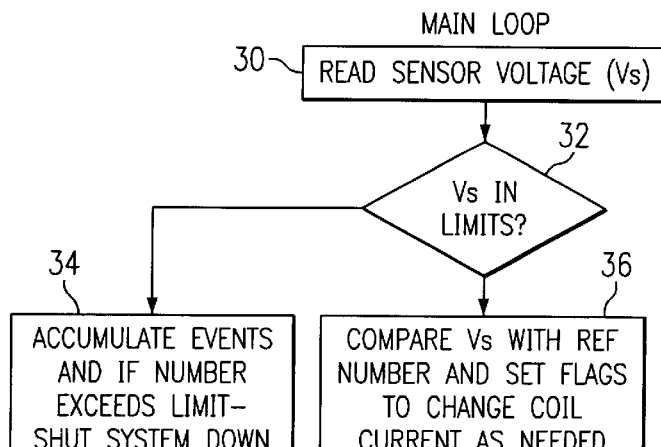
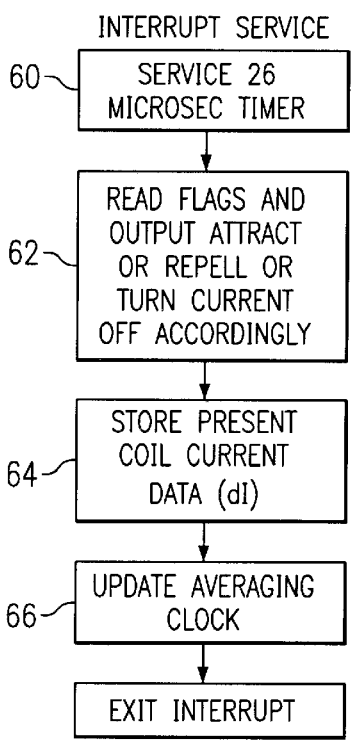
Fig. 4
Fig. 6
Fig. 5

MAGNETIC FLOATATION CONTROL SYSTEM

CROSS REFERENCE TO RELATED APPLICATION

This application claims the benefit of U.S. Provisional Application Ser. No. 60/103,137, filed on Oct. 5, 1998.

BACKGROUND

This invention relates to a system for magnetic suspension of objects. More specifically, it relates to a system that enables an object to float at a certain position unsupported by any mechanical attachment. The position of the floating object is closely controlled by a microprocessor controlled electromagnetic source.

In the past, magnetism has been used to float objects with varying degrees of limitations. For example, PCT Application No. WO 97/09540 discloses a system for magnetically suspending an object. The system employs a strong permanent magnet in the object being floated and a separate solenoid, comprised of a large coil wrapped around a small permanent magnet and two small cylindrical soft iron core pieces. In addition, two Hall effect sensors are provided to sense field intensity at the end of the coil assembly, and an electronic circuit converts the sensors' output to control the coil current. The principle force offsetting gravity of the object being floated is the attraction of the permanent magnet.

To operate this system, a user must adjust one or two potentiometers that translate the amplified sensor signals to a voltage range accepted by a set of voltage comparators. When adjusted correctly for the weight of the object to be floated, a relatively small current in the coil will cause a force that acts to repel the permanent magnet in the floating object to achieve a balance such that the total magnetic field applied cancels out the gravity. Once the object is in this balanced position, any deviation in the position of the floating object in the magnetic field produces a change in the Hall effect sensor's output which results in an imbalance in the comparator circuit. The comparator signals are then converted to pulse width modulated ("PWM") signals of correct polarity to change the coil current signal and hence adjust the overall magnetic field in such a way as to push the object back to the position of balance.

This prior system encounters several problems. For example, because the system amplifies the Hall effect sensor output by a factor of 8–10 thousand, a weight change of only a few ounces of the floating object will cause a change in position that will in turn drive the amplified signal out of the useful range of the comparators. As a result, non-technically proficient users of the system (such as sales and marketing people who may need to float a variety of objects) must become proficient in making rather complicated and sensitive adjustments. Such a requirement is undesirable.

Also, the system requires that the coil assembly be mechanically isolated from its mounting structure because it is not always possible to hold the floating object when the system is mechanically perturbed, e.g., bumped or vibrated. The coil assembly is therefore hung from its mounting position by an elastic band which reduces the effect of a mechanical input. However, using such a band causes certain mechanical problems; for example, the coil assembly must be allowed to droop below its mounting structure which makes the packaging less attractive and adds to the overall size of the system. The band also greatly complicates assembly of the system.

An improved method and system is needed for easily and smoothly placing a floating object in a balanced position and thereafter for continuously and automatically controlling the position of the floating object, and for avoiding disruptions caused by minor external forces perturbing the floating object. An improved, more economical circuit design for such a system is also needed. In addition, an improved method and system is needed to accommodate suspension of a wide weight range of objects.

SUMMARY OF THE INVENTION

The present invention provides an improved and economical system and method for magnetically floating an object. The system provides a user friendly interface for initially placing the object to be floated in a proximately balanced position. The system swiftly adjusts the object to a position such that a stable, floating condition is met. Once the object is located in the stable position, the system continuously, automatically, and intelligently adjusts the position of the floating object, responding to minor position changes of the object to keep the object floating without disruption. A wide weight range of objects can be accommodated for flotation.

The system includes an improved electromagnetic source that is relatively precise in the support of objects, while reducing the overall cost of the system. A control circuit of the electromagnetic source utilizes a microprocessor and a single Hall effect sensor. The Hall sensor's output voltage passes through an amplifier and is moderately amplified, e.g., by a factor of about 10, and is then sent to an analog to digital conversion input of the microprocessor. Signals are processed in the microprocessor, and the resulting output signals are directed to a current generating circuit for continuously controlling and adjusting the position of the floating object by modifying characteristics of a magnetic field created by the electromagnetic source.

BRIEF DESCRIPTION OF THE DRAWINGS

FIG. 4 is a flow diagram for showing different operational stages of the flotation system of FIG. 1A.

FIG. 5 is a flow diagram illustrating steps taken by the system of FIG. 1A under the control of firmware control codes programed in the microprocessor.

FIG. 6 is a flow diagram of functions of a subroutine included in the firmware control codes of the microprocessor of the system of FIG. 1A.

DETAILED DESCRIPTION

Figure 1A:
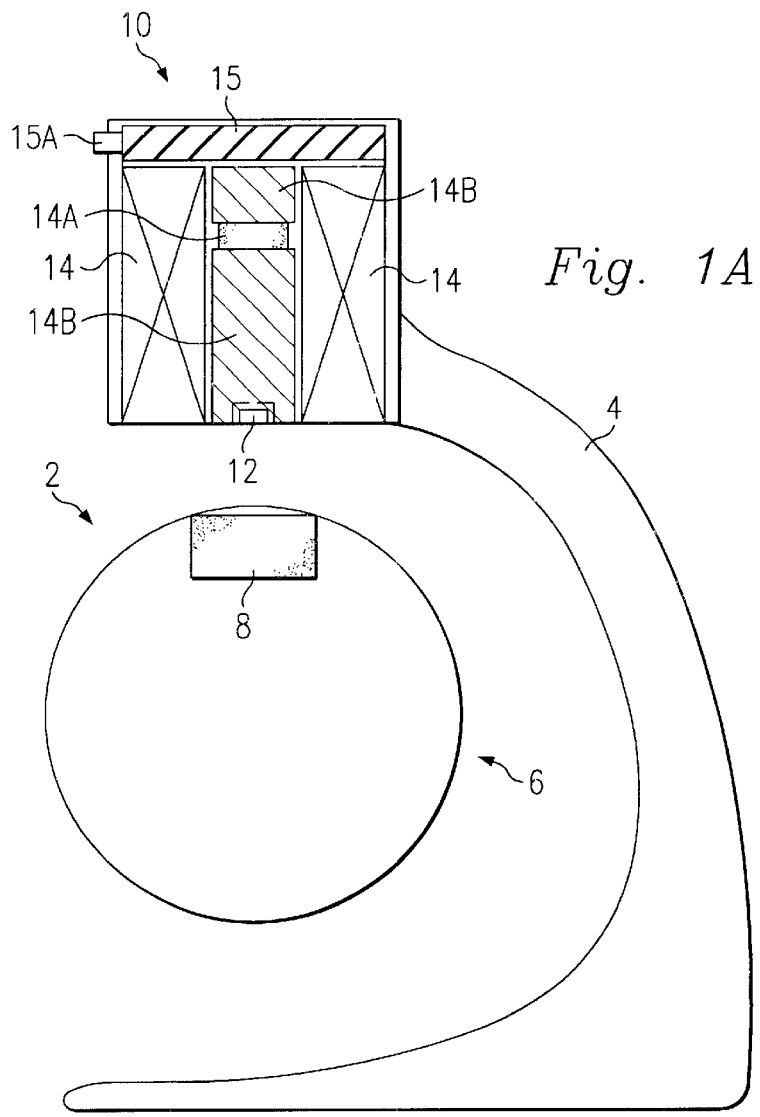
FIG. 1A is a side elevational, schematic view of a magnetic flotation system of the present invention.

Referring to FIG. 1A, the reference numeral 2 refers to a magnetic flotation system embodying the present invention. The system 2 includes an electromagnetic source 10 located at a high position and connected to a mounting structure 4, the mounting structure serving as a mechanical support for the electromagnetic source. Under control of the electromagnetic source 10, an object 6 having a permanent magnet 8 embedded therein, is floated in the air without any mechanical support from, or mechanical attachment to, the electromagnetic source 10. Inside the electromagnetic source 10, there is a separate coil assembly 14, comprised of a large coil wrapped around a small permanent magnet 14A and two pieces of iron core 14B. In one example embodiment, a Hall effect sensor 12 is attached to the bottom the electromagnetic source 10 (FIG. 1A) to sense field intensity at the end of the coil assembly 14. In addition, an electronic circuit 15 connects to both the sensor 12 and the coil assembly 14 (not shown) and converts the sensor's output to control the coil current. Also as part of the electromagnetic source 10, a visual indicator 15A is also included to indicate the operation status of the system.

Figure 1B:
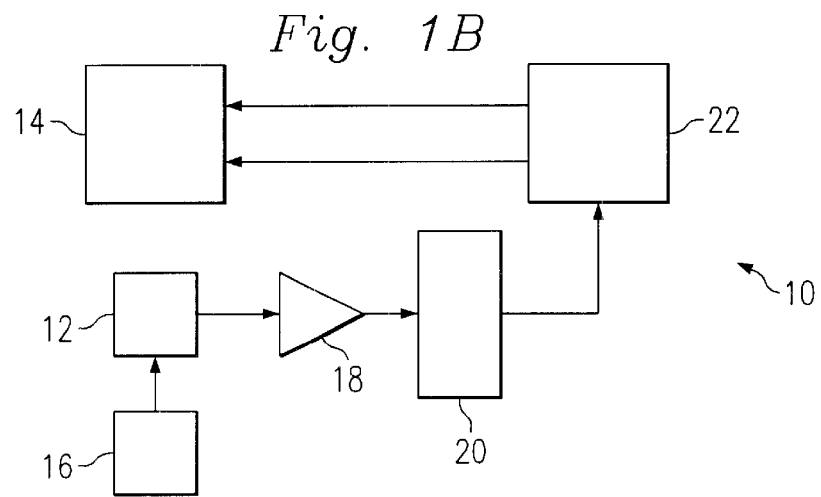
FIG. 1B is a block diagram illustrating an embodiment of an electromagnetic source for the system of FIG. 1A.

FIG. 1B illustrates a block diagram of an example electronic circuit layout of the electromagnetic source 10 for the system 2. The electronic circuit 15 of the electromagnetic source 10 is a microprocessor based control circuit that is connected to the Hall effect sensor 12 and to the coil assembly 14. A constant current generator circuit 16 provides the Hall effect sensor 12 with a consistent current. The output of the Hall effect sensor 12 is provided to an amplifier circuit 18, and subsequently sent to a microprocessor 20 for further processing. The output of the microprocessor 20 feeds into a current generator circuit 22, which controls and adjusts the current of the coil assembly 14 that in turn, depending on the polarity and strength of the current, changes characteristics of a magnetic field produced by the coil assembly 14.

Figure 2:
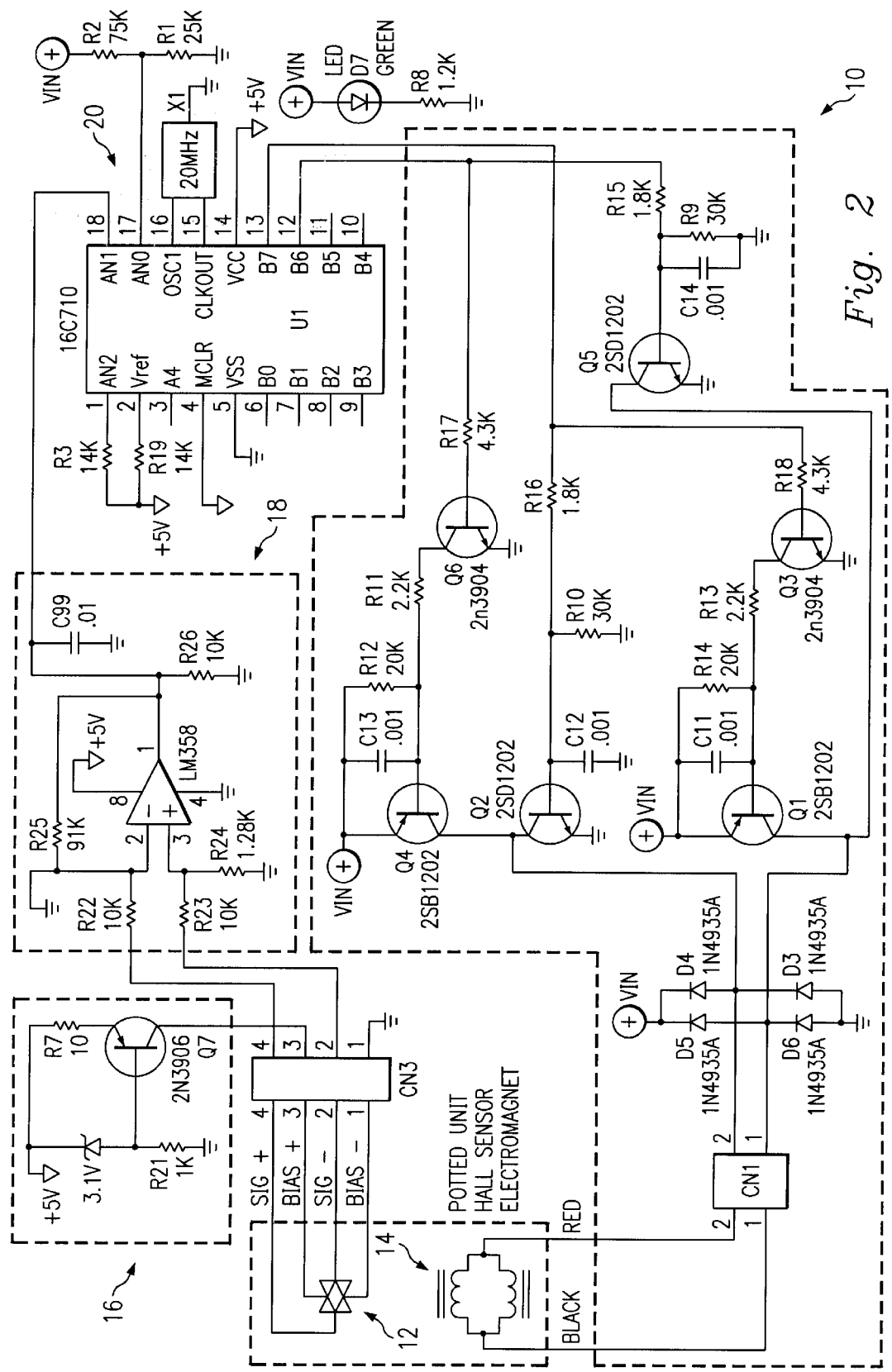
FIG. 2 is a schematic circuit diagram of an embodiment of the electromagnetic source of FIG. 1B.

FIG. 2 is a detailed schematic of the circuit design of FIG. 1B. The constant current generator circuit Q7, which is also represented by numeral 16, provides a bias current to the Hall effect sensor 12 through a connector CN3. The Hall effect sensor's outputs, or the sensed signals, which are connected to Pins 4 and 2 of the connector CN3, feed into the amplifier circuit 18. Various resistors, along with a capacitor, are connected to an Op-amp LM358 to give an amplification factor of about 10. Unlike substantially large amplification factors of 8–10 thousand used in some other systems, this dramatically reduced amplification factor desensitizes the entire circuit so that any unexpected electronic resonance will not undesirably disrupt the normal operation of the system. Moreover, the present invention can easily accommodate a wide weight-range (e.g. 1–6 pounds) of objects to be floated since with the low amplification factor, the entire system can tolerate a wider change of weight of the floating object. The amplifier circuit 18 thus amplifies the sensor signals with an acceptable gain and then sends a single voltage output to a microprocessor U1, which is also designated by numeral 20. This amplified sensor signal or sensor voltage is fed into an analog to digital conversion input AN1 on the microprocessor U1.

The amplified sensor signal at AN1 is further processed in the microprocessor 20. It is first digitized, and then compared to a references voltage value generated by a set of control codes of the microprocessor 20. Thereafter, two current control signals are estimated and calculated accordingly. The current control signals outputted through pins B7 and B6 of the microprocessor, and further directed to the current generator circuit 22 to adjust the coil current, thereby affecting the overall magnetic field and maintaining the floating object in a balanced position.

Figure 3:
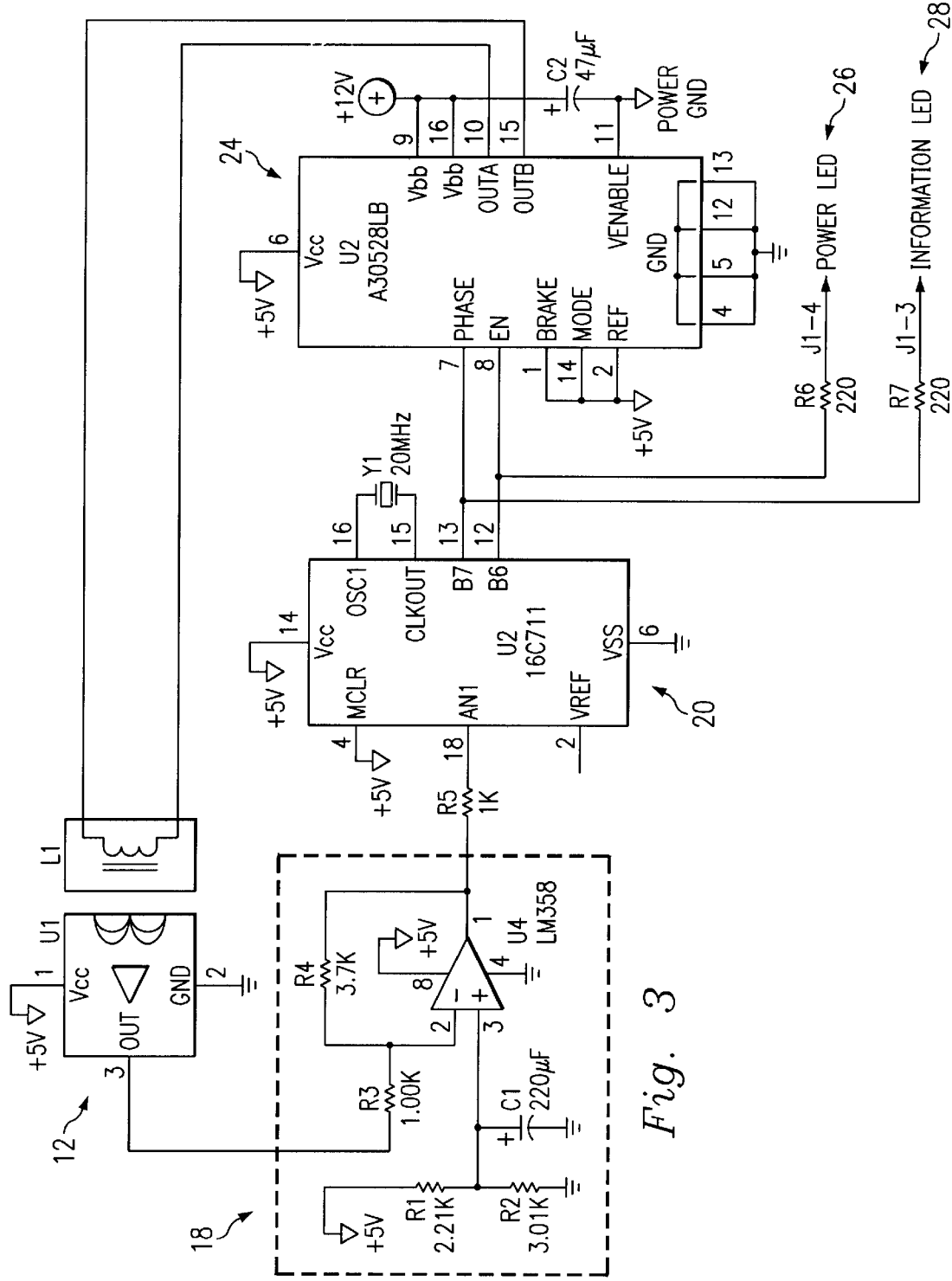
FIG. 3 is another schematic circuit schematic diagram of an embodiment of the electromagnetic source in FIG. 1B.

FIG. 3 is another embodiment of the electronic circuit design of the electromagnetic source 10 (FIG. 1B). In this circuit, the Hall effect sensor 12 only produces one output, which feeds into pin 2 of the Op-amp LM358. The amplified sensor signal goes directly into pin AN1 of the microprocessor 20. In the present embodiment, the microprocessor 20 is a commercially available 16C711 model unit. It has OSC1 and CLKOUT pins, which are connected to an external crystal to create a certain clock frequency. Besides VCC, VSS, MCLR, which are either tied to 5V or Ground, many of the other pins are not used, and are therefore not shown. Replacing the analog current generating circuit, a A3953SLB integrated circuit (Bridge IC) unit 24 is used. Most of the pins of the Bridge IC are not used in this application, pin PHASE and EN become two inputs for receiving signals from B6 and B7 of the microprocessor, and OUTA and OUTB direct the coil current. In addition, two LED lights, numeral 26 and 28, may be connected to B6 and B7 of the microprocessor for providing a visual indication of the power and the operation status of the system. For instance, in one example, these LED lights can indicate to a user of the system whether the object is under a firm control of the system. They can also indicate whether the system is shut down due to excessive coil current or excessive sensor voltage readings.

As shown in FIG. 4, there are generally three phases for the operation of a flotation system 2. The initial acquisition mode refers to a period of time when an object is introduced to the flotation system 2. To implement a more user friendly interface when a user initially tries to place an object 6 for flotation in the system 2, the system 2 provides a sensible or tactile feedback when the user is holding the object to the magnetic field so that the object can be swiftly placed in a desired position range. Thus the user can follow the attracting or propelling force of the magnetic field to move the object towards a correct direction. Further, once the object is moved to the desired position range, the user can then feel a slight directional switch of the magnetic force. This switch indicates that the object is "clicked" in the right position so that the user can gradually release the object and let the system take control. Since the weight of a new object is initially unknown to the system and the weight is the most important factor that determines the final position of the object, the system 2 first makes adjustments using broad control limits in order to impose sufficient control for causing the object to float. The system 2 starts by anticipating the lowest weight and moves progressively towards heavier ones as the user smoothly releases more and more weight from his hands. The user feels a slight tugging up and down to indicate the position of the object that the system 2 expects it to move to. This tugging feeling is created by switching the polarity of the coil current.

Next, the system 2 is switched into a calibration mode. In this mode, the system 2 takes control of the object 6 from the user completely, and it needs to make additional adjustments to place the object to a final floating location. This requires multiple adjustments in a very short period of time to get the object in place so that the user can completely and swiftly free the object. The system 2 is calibrated so that the operating coil current is less than 90 mA. Although the system 2 can operate at a very large range of coil current, operating at the lowest reasonable current makes the largest gap between the floating object and the overhead coil assembly. Also, a low current operation makes it possible to run the whole system by a battery. Moreover, a low current is less likely to generate a great deal of heat in the system so that circuits can remain comparatively cool.

Once the calibration mode is over, the object 6 is in a comparatively stable flotation mode wherein only major external impacts can set the object out of the predetermined position range and thus disrupt the operation of the system 2. In general, while the system 2 is in this mode, a relatively low coil current is maintained. The sensor voltage is also restrained in a predetermined range, and the object is not moving more than within a small predetermined range. Since the system includes mechanical components, moments of external inertia or various restoring forces can produce resonances and natural frequencies which may cause damaging corruptions of the entire system. For example, when the floating object is bumped by some outside force, the system is designed to strive to return the displaced object back to a desired position.

The features described above in discussion of the three different operation modes are implemented using microprocessor circuit designs as described in the present disclosure. The electromagnetic source 10, including system firmware in the microprocessor 20, estimates the coil current that the flotation system commands, digitizes sensor outputs for different object position measurements, and establishes a variable reference voltage value. The digitized sensor output is compared in the microprocessor 20 with a reference voltage value, and the difference between them is an error value that directs the system either to repel or attract the object.

In one example, a range of the coil current is predetermined to be the acceptable operating range whereby the system 2 is considered to be in a good operation mode if a minimum coil current in this acceptable operating range creates a small repelling force that, together with the gravity of the floating object, offsets or balances the upward attracting force created by the coil assembly and the permanent magnet in the floating object 6. Therefore, depending on the weight of a particular floating object, the location of the object with regard to the coil assembly may change.

The microprocessor 20 periodically estimates and adjusts the needed coil current based on the amplified input signal provided by the Hall effect sensor. The coil current is thus estimated in the microprocessor on a running basis in the microprocessor. The frequency of the measurements can be programed by the control code, and in some embodiments, all measurements are accomplished in an interrupt driven subroutine periodically. For example, the interrupt subroutine is invoked at small predetermined intervals, e.g., every 26 microseconds, to measure and store values of the coil current (dI) at those corresponding moments. Other subroutines at longer intervals effectively sum the dI and produce moving averages of such measurements, which render dynamic measurements of the coil current.

A benefit of the system 2 is that control forces intended to move the floating object 6 are always smoothly inserted. Further, a restoring force generated by the electromagnetic source, together with the weight of the floating object and its moments of inertia, can all contribute to establishing unneeded mechanical resonances which, if excited by outside or control forces, can cause a loss of control of the entire system 2. Thus, the system 2 monitors the rate of changes and out-of-limit measurements of the coil current, especially in the stable operation mode. If instability persists beyond a set time limit, or the sensor voltage stays beyond a set limit for a period of time, the microprocessor 20 is programmed to shut down the whole system.

Further, visual indications are provided to users by a system status indicator 15A, that communicates the operation of the system 2. For example, when the power is first applied to the system 2, a light emitting diode (LED) is immediately turned on. When an object 6 is successfully acquired by the system and floated, another LED can be turned on so that a user of the system can be informed that the system has successfully entered into the stable operation mode.

Attachment A below provides example firmware control code used by the microprocessor 20 (U1). The firmware code is organized with one main loop and an interrupt driven subroutine that occurs at certain time intervals.

FIG. 5 is a flow diagram illustrating steps taken in the main loop of the firmware in Attachment A. At step 30, the sensor voltage is read, and if the reading is determined to be beyond a set limit at step 32, and if it is an accumulated event that has been persistent for a period of time, the system 2 may be shut down at step 34. Since the sensor voltage is indicative of a position of the object 6 with respect to the electromagnetic source, if the object 6 is not positioned in a certain position range, the sensor voltage will be beyond the limits. If this phenomenon persists, the system 2 will simply stop operating by shutting down the coil current. If the sensor voltage is within the limit, it is compared with an estimated reference voltage value and changes of the coil current are made accordingly (up or down) at step 36. At step 38, the interrupt subroutine breaks into the main loop to provide a value of the coil current (dI) at this instant. Then a moving average of such a value is obtained in a longer time period to represent the coil current. Subsequently, at step 40, the coil current is checked against a first set of limits. If the coil current is persistently outside the set limits, the coil current will be shut down at step 42.

At step 44, the coil current is once again checked against a second, narrower set of limits to determine if the system is stable. At step 46, the system counts the out-of-limit events, and if such count exceeds a certain limit, a stability flag is reset to indicate that the system has been disturbed. Immediately following step 44, if the object is considered to be stable at step 48, but the coil current is above the high limit of the second set of limits, an adjustment must be made at step 50 to change the reference voltage value accordingly to drive the coil current down. If the coil current is below the low limit of the second set of limits at step 52, then an adjustment at step 54 also should be made to change the reference voltage value such that the coil current will be changed upward. There is no need to change the reference voltage value if the coil current stays within the set limits.

FIG. 6 is a flow diagram for the interrupt subroutine of the system 2 that is invoked periodically to perform certain functions. At step 60, in the present example, a timer invokes the subroutine every 26 microseconds. The subroutine also carries out the adjustments needed at step 62 to control the floating object. The coil current is modified to output an attracting or repelling force to the floating object, or completely shut off the coil current if the system so instructs. The subroutine then measures and stores an instant value of the coil current, which is the dI, at step 64. Eventually, the subroutine updates an averaging clock at step 66, which is responsible for invoking a longer time period for calculating the moving average of the stored values of dI. Thus, the subroutine works seamlessly with the main loop for a close and intelligent control of the entire system.

In the present invention, the coil current is a variable that the system try to adjust constantly until it reaches a value in an acceptable operating range. The system achieves this by adjusting the estimated reference voltage value. The difference between this estimated reference voltage value and the amplified sensor signals after digitization, i.e., the sensor voltage, creates an error value, which further controls the coil current. For instance, according to one embodiment of the present invention, if this error value exceeds a predetermined threshold such as 20 mV, the polarity of the coil current will be flipped. Because the coil assembly has a high inductance, this abrupt change of polarity does not cause a sudden change of the moving direction of the floating object. Rather, it is a gradual and smooth change. This process is continuing until the error value is diminished to an acceptable one. When the error value is small, it does not alone mean that the floating object is in a perfect balance. If the system examines the coil current value and finds that it is out of a predetermined range, the system, through the microprocessor, will introduce another reference voltage value either bigger or smaller than the current value in order to move the coil current into the predetermined range. When both the coil current is in the range and the error value is minimal, the floating object is considered to be in a balance and is accepted by the system.

In the stable operation mode, as mentioned above, it is also very important that the sensor voltage be closely and accurately monitored during the stable operation mode since this voltage value represents the position of the floating object. Another feature of the firmware control code is to eliminate effects of external interferences that may cause distorted reading of the sensor voltage. Therefore, under the instruction of the control code, when the system is in the stable operation mode, the system stores the value of the coil current. In case any external force perturbs the system and causes a rise or fall of the coil current, the change of the coil current relative to the stored coil current can be calculated. This change of the coil current is sensed by the sensor and undesirably affects the sensor voltage. However, a linear relation is found between the change of the coil current and the change of the sensor voltage. The system can thereby adjust the sensor voltage value to eliminate the distorted reading caused by the change of the coil current, and hence, provides a more accurate indication of the position of the floating object.

Therefore, all the calculations of the coil current are done within the microprocessor. Moreover, the use of the microprocessor 20 eliminates the need of adjusting external electronic values such as amplification gains, offset voltages, etc., either manually or under the control of a digital component. This improved design represents a significant cost savings, which may about to a 30 percent reduction comparing to some other design of the flotation system 2.

An additional advantage of this improved system 2 is that mechanical isolation of the coil assembly is not necessary for maintaining the stable operation of the floating object 6 since the system now affords a much finer control of the floated object.

The present disclosure provides many different embodiments, or examples, for implementing different features of the invention. Also, specific examples of components, and processes are described above to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

Attachment A

```
MSI MCU CONTROL PROGRAM GP52803b
USE 20MHz CLOCK
LIST        P=16C711, W=1, N=75
HS, POWER UP TIMER, BROWN OUT
    __CONFIG   0x3FFA      ;NO CODE PROTECT FOR TESTING PURPOSES
    __CONFIG   0x004A      ;CODE PROTECTED FOR PRODUCTION
    INCLUDE    "P160711.INC"
REFV    EQU    0x80        ;REFERNCE VOLTAGE READING = VALUE x 0.02V
NHLMT   EQU    0x1E        ;HIGH LIMIT = (256-VALUE) * 0.02V = 4.5
NLLMT   EQU    0xF5        ;LOW LIMIT = (256-VALUE) * 0.02V = .2
REFHLM  EQU    NHLMT+8     ;4.66
REFLLM  EQU    NLLMT-4     ;.12
CRLVAL  EQU    0X82        ;orig=0xA0,88
CRHVAL  EQU    0x84        ;ORIG 0xC2.9C
STDONV  EQU    0x06        ;5 OF 32 GIVES 120 OUT OF 768
STDWDV  EQU    0x20        ;WHICH GIVES US CURRENT VALUE OF 143 (0x8F)
ONEONV  EQU    0x10        ;50% DUTY
ALWONV  EQU    0x20
RFCVAL  EQU    0x03        ;REF COUNT VALUE FOR STABILITY
DSVAL   EQU    0x01        ;TIMES WE THINK WE SHOULD SHIFT BEFORE WE DO
;       PORTB BIT DEFINITIONS
AIRVAL  EQU    0xC0
REPVAL  EQU    0xE0
OFFVAL  EQU    0x70
;       FLG1 BIT DEFINITIONS
;       ECU    7
;       EQU    6
;       EQU    5
RCNTEN  EQU    4
CCSTR   EQU    3
LIMERR  EQU    2
ATTREP  EQU    1
ONOFF   EQU    0
;       FLG2 BIT DEFINITIONS
;       EQU    7           ;upper half used for counter
;       EQU    6
;       EQU    5
;       EQU    4
```

-continued

Attachment A

| | | | |
|---|---|---|---|
| AVGOK | EQU | 3 | |
| COFF | EQU | 2 | |
| CRLIMF | EQU | 1 | |
| AVGCMP | EQU | 0 | |
| ; | REGISTERS | | |
| CRLOK | EQU | 0x0C | ;CURRENT VALUE AT LOCK |
| FLG1 | EQU | 0x0D | ;FLAG REGISTER |
| FLG2 | EQU | 0x0E | |
| TEMP | EQU | 0x0F | |
| CRTOTH | EQU | 0x10 | |
| CRTOTL | EQU | 0x11 | |
| LIMCNT | EQU | 0x12 | |
| MAVGH | EQU | 0x13 | |
| MAVGL | EQU | 0x14 | |
| CRCNT | EQU | 0x15 | |
| CRSAV | EQU | 0x16 | |
| MAFH | EQU | 0x17 | |
| MAFL | EQU | 0x18 | |
| ACC1 | EQU | 0x19 | |
| ACC0 | EQU | 0x1A | |
| REFSTB | EQU | 0x1B | |
| UPSTB | EQU | 0x1C | |
| DWNSTB | EQU | 0x1D | |
| CRLNOW | EQU | 0x1E | |
| WTHCNT | EQU | 0x22 | |
| PCNTDW | EQU | 0x23 | |
| VL | EQU | 0x24 | ;VOLTAGE |
| REFVAL | EQU | 0x25 | ;CALCULATE REFERENCE VOLTAGE |
| AVGCL | EQU | 0x26 | |
| REFCNT | EQU | 0x27 | |
| OFFCNT | EQU | 0x28 | |
| DV | EQU | 0x29 | |
| DVPRV | EQU | | |
| DSCNT | EQU | | |
| CRLCTL | EQU | | |
| CRLCTH | EQU | 0x2D | |
| STSAVE | EQU | 0x2E | |
| WSAVE | EQU | 0x2F | |
| | ORG | 0x000 | |
| RSTADR | GOTO | START | |
| | ORG | 0x004 | |
| ;INTERRUPT SERVICE FOR TIMER 0 OVERFLOW (16 CYCLES) | | | |
| INTSR | MOVWF | WSAVE | ;SAVE W |
| | MOVF | STATUS,W | |
| | MOVWF | STSAVE | |
| | MOVLW | 0x80 | ;0x80 - SET TO 26uS 38.4k baud |
| | ADDWF | TMR0 | |
| | BTFSS | FLG1,ONOFF | |
| | GOTO | STOFF | |
| | BTFSS | FLG1,ATTREP | |
| | GOTO | STREP | |
| STATR | DECF | CRCNT | |
| | MOVLW | ATRVAL | ;GET ATTRACT VALUE FOR PORTB |
| | GOTO | CHKTMO | |
| STOFF | MOVLW | OFFVAL | ;GET OFF VALUE FOR PORTB |
| | GOTO | CHKTMO | |
| STREP | INCF | CRCNT | ;ADD ONE IF REPELL |
| | MOVLW | REPVAL | ;GET REPELL VALUE FOR PORTB |
| CHKTMO | MOVWF | PORTB | |
| | DECFSZ | AVGCL | |
| | GOTO | INTXIT | |
| | MOVLW | 0x7F | |
| | MOVWF | AVGCL | ;ONLY WANT 127 |
| | BSF | FLG2,AVGCMP | |
| | MOVF | CRCNT,W | |
| | MOVWF | CRSAV | |
| | CLRF | CRCNT | |
| INTXIT | BCF | INTCON,T0IF | ;CLEAR FOR NEXT PERIOD |
| | MOVF | STSAVE,W | ;RESTORE STATUS AND W |
| | MOVWF | STATUS | |
| | SWAPF | WSAVE | |
| | SWAPF | WSAVE,W | |
| | RETFIE | | |
| START | CALL | INIT | ;INITIALIZE REGISTERS |
| LOOP1 | BSF | INTCON,GIE | |
| | BSF | INTCON,T0IE | ;RE-ENABLE INTERRUPT |
| | CALL | RDVLT | ;READ THE VOLTAGE SET LIMERR |

-continued

Attachment A

| | | | |
|---|---|---|---|
| | BTFSC | REFSTB,0 | ;SKIP IF STABLE |
| | GOTO | DOIT | |
| | CALL LOOP2 | | ;SIMPLE LOOP FOR LOCK CONDITION |
| DOIT | CALL | STCOIL | ;COMPARE TO REFERENCE AND SET COIL OUTPUTS |
| | BTFSC | FLG2,AVGCMP | ;WAIT FOR TIME OUT PERIOD |
| | CALL | CRRNT | |
| | | | ;OUTPUT LOCK INDICATOR |
| | INCF | REFSTB,W | |
| | BZ | X3 | |
| | BSF | PORTA,2 | |
| | GOTO | LOOP1 | |
| X3 | BCF | PORTA,2 | |
| | GOTO | LOOP1 | |
| LOOP2 | BCF | INTCON,GIE | |
| | BCF | INTCON,T0IE | |
| | CALL | RDVLT | |
| | BTFSC | FLG1,LIMERR | ;NEWSTCOIL ROUTINE |
| | GOTO | LMOFF | |
| | CLRF | LIMCNT | |
| CHKAT1 | MOVF | REFVAL,W | |
| | SUBWF | VL,W | |
| | BZ | STOFF1 | |
| | BNC | CHKRP1 | |
| | MOVLW | ATRVAL | |
| | GOTO | CHKT1 | |
| CHKRP1 | MOVLW | REPVAL | |
| | GOTO | CHKT1 | |
| CHKT1 | MOVWF | PORTB | |
| | GOTO | LOOP2 | |
| STOFF1 | GOTO | LOOP2 | |
| LMOFF | INCF | LIMCNT | |
| | BTFSS | LIMCNT,2 | |
| | GOTO | LOOP2 | |
| | CALL | CUROFF | |
| | BCF | FLG1,ONOFF | |
| | RETURN | | ;TO LOOP1 |
| RDVLT | BCF | FLG1,LIMERR | |
| | CALL | RDAIN1 | |
| | MOVWF | VL | |
| | MOVLW | NHLMT | ;NEGATIVE OF HIGH LIMIT |
| | ADDWF | VL,W | |
| | SKPNC | | |
| | BSF | FLG1,LIMERR | |
| | MOVLW | NLLMT | ;NEGATIVE OF LOW LIMIT |
| | ADDWF | VL,W | |
| | SKPC | | |
| | BSF | FLG1,LIMERR | |
| | RETURN | | |
| STCOIL | BTFSC | FLG1,LIMERR | |
| | GOTO | LIMOFF | |
| | CLRF | LIMCNT | |
| CHKATR | MOVF | REFVAL,W | |
| | SUBWF | VL,W | |
| | BNC | CHKREP | |
| | ADDLW | 0xFF | ;CHECK FOR 1 OR MORE (ADD −1) |
| | BC | SETATR | |
| | BCF | FLG1,ONOFF | |
| | RETURN | | |
| CHKREP | XORLW | 0xFF | ;NEGATE W |
| | ADDLW | 0x01 | |
| | ADDLW | 0xFF | ;CHECK FOR 2 OR MORE |
| | BC | SETREP | |
| | BCF | FLG1 ,ONOFF | |
| | RETURN | | |
| SETATR | BSF | FLG1,ATTREP | ;SET OUTPUTS TO ATTRACT |
| | BSF | FLG1,ONOFF | |
| | GOTO | CHKCON | |
| SETREP | BCF | FLG1,ATTREP | ;SET OUTPUTS TO REPELL |
| | BSF | FLG1,ONOFF | |
| | GOTO | CHKCON | |
| LIMOFF | INCF | LIMCNT | |
| | BTFSS | LIMCNT,2 | |
| | RETURN | | |
| | CALL | CUROFF | |
| | BCF | FLG1,ONOFF | |
| | RETURN | | |
| CHKCON | BTFSC | FLG2,COFF | |

-continued

Attachment A

| | | | |
|---|---|---|---|
| | BCF | FLG1,ONOFF | |
| | RETURN | | |
| CRRNT | BCF | FLG2,AVGCMP | |
| | MOVF | CRSAV,W | |
| | ADDWF | CRTOTL | |
| | MOVLW | 0X00 | |
| | BTFSC | CRSAV,7 | |
| | MOVLW | 0xFF | |
| | SKPNC | | |
| | ADDLW | 0x01 | |
| | ADDWF | CRTOTH | |
| | MOVLW | 0x10 | |
| | ADDWF | FLG2 | |
| | SKPC | | |
| | RETURN | | |
| | MOVLW | 0xA0 | |
| | IORWF | FLG2 | |
| | MOVLW | 0x05 | |
| | MOVWF | TEMP | |
| SHFLPC | CLRC | | |
| | RLF | CRTOTL | |
| | RLF | CRTOTH | |
| | DECFSZ | TEMP | |
| | GOTO | SHFLFC | |
| | MOVLW | 0x80 | |
| | ADDWF | CRTOTH | |
| | CLRC | | |
| | MOVF | MAVGH,W | ;CALCULATE THE MOVING AVERAGE |
| | BTFSC | MAVGL,7 | |
| | INCFSZ | MAVGH,W | |
| | SUBWF | MAVGL | |
| | SKPC | | |
| | DECF | MAVGH | |
| | SETC | | |
| | MOVF | CRTOTH,W | |
| | BTFSC | CRTOTL,7 | |
| | INCFSZ | CRTOTH,W | |
| | ADDWF | MAVGL | |
| | SKPNC | | |
| | INCF | MAVGH | |
| | SWAPF | MAFH,W | |
| | ANDLW | 0x0F | |
| | MOVWF | ACC1 | |
| | SWAPF | MAFH,W | |
| | ANDLW | 0xF0 | |
| | MOVWF | ACC0 | |
| | SWAPF | MAFL,W | |
| | ANDLW | 0x0F | |
| | IORWF | ACC0 | |
| | MOVLW | 0x00 | |
| | BTFSC | MAFL,3 | |
| | MOVLW | 0x01 | |
| | ADDWF | ACC0 | |
| | SKPNC | | |
| | INCF | ACC1 | |
| | MOVF | ACC0,W | |
| | SUBWF | MAFL | |
| | MOVF | ACC1,W | |
| | SKPC | | |
| | INCFSZ | ACC1,W | |
| | SUBWF | MAFH | |
| | SWAPF | CRTOTH,W | |
| | ANDLW | 0x0F | |
| | MOVWF | ACC1 | |
| | SWAPF | CRTOTH,W | |
| | ANDLW | 0xF0 | |
| | MOVWF | ACC0 | |
| | SWAPF | CRTOTL,W | |
| | ANDLW | 0x0F | |
| | IORWF | ACC0 | |
| | MOVLW | 0x00 | |
| | BTFSC | CRTOTL,3 | |
| | MOVLW | 0x01 | |
| | ADDWF | ACC0 | |
| | SKPNC | | |
| | INCF | ACC1 | |
| | MOVF | ACC0,W | |

-continued

Attachment A

|  |  |  |  |
|---|---|---|---|
|  | ADDWF | MAFL |  |
|  | MOVF | ACC1,W |  |
|  | SKPNC |  |  |
|  | INCFSZ | ACC1,W |  |
|  | ADDWF | MAFH |  |
|  | MOVF | CRTOTH,W |  |
|  | MOVWF | TEMP |  |
|  | CLRF | CRTOTH |  |
|  | CLRF | CRTOTL |  |
|  | BCF | FLG2,CRLIMF |  |
|  | MOVLW | 0x20 |  |
|  | ADDWF | MAVGH,W |  |
|  | SKPNC |  |  |
|  | CALL | CRLIM |  |
|  | MOVLW | 0xEE |  |
|  | ADDWF | MAVGH,W |  |
|  | SKPC |  |  |
|  | CALL | CRLIM |  |
|  | BTFSC | FLG2,CRLIMF |  |
|  | GOTO | NOCRCT |  |
|  | CLRF | CRLCTL |  |
|  | CLRF | CRLCTH |  |
| NOCRCT | MOVLW | CRLVAL | ;CHECK FOR MOVING AVG IN RANGE |
|  | SUBWF | MAVGH,W |  |
|  | BNC | CONCHK | ;NO |
|  | MOVLW | CRHVAL |  |
|  | SUBWF | MAVGH,W |  |
|  | BC | CONCHK |  |
|  | DECF | REFCNT |  |
|  | SKPNZ |  |  |
|  | CLRF | REFSTB |  |
| CONCHK | MOVLW | CRLVAL |  |
|  | SUBWF | TEMP,W | ;CRTOTH IS IN TEMP |
|  | BC | CHKDWN | ;CHECK FOR SHIFT DOWN IF NO BORROW (C) |
|  | MOVLW | CRLVAL |  |
|  | SUBWF | MAFH,W |  |
|  | BC | NOSHFT |  |
|  | MOVLW | CRLVAL | ;LOW END OF DESIRED CURRENT RANGE |
|  | SUBWF | MAVGH,W |  |
|  | BC | NOSHFT | ;RETURN IF NO BORROW (C) |
|  | INCF | REFSTB,W |  |
|  | BZ | SKPMA1 | ;IF NOT STABLE GO AHEAD AND SHIFT |
|  | DECFSZ | UPSTB |  |
|  | GOTO | NSHFT |  |
| SKPMA1 | MOVLW | 0xFF |  |
|  | GOTO | DCSHFT |  |
| CHKDWN | MOVLW | CRHVAL |  |
|  | SUBWF | TEMF,W | ;CRTOTH IS IN TEMP |
|  | BNC | NSCROK | ;IN RANGE IF BORROWED (NC) |
|  | MOVLW | CRHVAL |  |
|  | SUBWF | MAFH,W |  |
|  | BNC | NOSHFT |  |
|  | MOVLW | CRHVAL |  |
|  | SUBWF | MAVGH,W | ;HIGH END OF DESIRED CURRENT REANGE; |
|  | BNC | NOSHFT | ;IN RANGE IF BORROWED (NC) |
|  | INCF | REFSTB,W |  |
|  | BZ | SKPMA2 | ; IF NOT STABLE GO AHEAD AND SHIFT |
|  | DECFSZ | DWNSTB |  |
|  | GOTO | NSHFT |  |
| SKPMA2 | MOVLW | 0x01 |  |
| DCSHFT | MOVWF | TEMP |  |
|  | CLRF | DWNSTB |  |
|  | CLRF | UPSTB |  |
|  | MOVLW | RFCVAL |  |
|  | MOVWF | REFCNT |  |
|  | INCF | REFSTB,W |  |
|  | BZ | NOSTB |  |
|  | DECFSZ | DSCNT |  |
|  | RETURN |  |  |
| NOSTB | MOVF | TEMP,W |  |
|  | BSF | PORTA,2 | ;INDICATE ADJUST PROCESS |
|  | BTFSC | TEMP,2 | ;SHORT PULSE FOR UP ADJUST |
|  | BCF | PORTA,2 |  |
|  | NOP |  |  |
|  | NOP |  |  |
|  | BCF | PORTA,2 | ;LONG PULSE FOR DWN ADJUST |
|  | ADDWF | REFVAL |  |

-continued

Attachment A

|  | | | |
|---|---|---|---|
|  | MOVLW | DSVAL | |
|  | MOVWF | DSCNT | |
|  | MOVLW | REFHLM | |
|  | ADDWF | REFVAL,W | |
|  | BC | SETHLM | |
|  | MOVLW | REFLLM | |
|  | ADDWF | REFVAL,W | |
|  | BNC | SETLLM | |
|  | RETURN | | |
| NSCROK | BTFSC | FLG1,RCNTEN | ;IS DECREFCNT ENABLED ? XXX |
|  | DECFSZ | REFCNT | |
|  | GOTO | NCSHFT | |
|  | CLRF | REFSTB | |
|  | BTFSC | FLG1 CCSTR | ;HAVE WE STORED CRTOTH? |
|  | MOVFW | TEMP | ;STORE CRTOTH FOR CORRECTION XXX |
|  | MOVWF | CRLOK | |
|  | BSF | FLG1,CCSTR | |
| NOSHFT | CLRF | UPSTB | |
|  | CLRF | DWNSTB | |
|  | MOVLW | RFCVAL | |
|  | MOVWF | REFCNT | |
| NSHFT | BCF | FLG1,RCNTEN | ;DISABLE REFCNT DEC XXX |
|  | MOVLW | DSVAL | |
|  | MOVWF | DSCNT | |
|  | RETURN | | |
| CRLIM | BSF | FLG2,CRLIMF | |
|  | INCFSZ | CRLCTL | |
|  | RETURN | | |
|  | INCF | CRLCTH | |
|  | BTFSC | CRLCTH,3 | |
|  | RETURN | | |
| STCOFF | BSF | FLG2,COFF | |
|  | RETURN | | |
| RDAIN0 | MOVLW | 0x81 | ;CHAN 0 |
|  | GOTO | RDAIN | |
| RDAIN1 | MOVLW | 0x89 | ;CHAN 1 |
| RDAIN | MOVWF | ADCON0 | |
|  | CALL | DLY3 | ;DELAY 3uS FOR SAMPLE SETTLING |
|  | BSF | ADCON0,GO | ;START CONVERSION |
| WTCMPL | BTFSC | ADCON0,GO | |
|  | GOTO | WTCMPL | |
|  | MOVF | ADRES,W | ;VALUE RETURNED IN W |
|  | RETURN | | |
| DLY3 | MOVLW | 0xFD | ;DELAY ~3.2US @ 20 MHz |
| DLYLP1 | ADDLW | 0x01 | ;DELAYS (−W + 1) * 4 * .2uS |
|  | BNZ | DLYLP1 | |
|  | RETURN | | |
| INIT | CLRF | STATUS | |
|  | MOVLW | OPTION_REG | ;INIT PAGE 1 REGISTERS |
|  | MOVWF | FSR | ;POINT TO OPTION REGISTER |
|  | MOVLW | 0x0F | ;ASSIGN PRESCALE TO WATCH DOG |
|  | MOVWF | INDF | |
|  | BSF | FSR,2 | ;POINT T0 DDRA |
|  | MOVLW | 0x0B | ;SET A0, A1 AND A3 AS INPUT, A2=OUTPUT (LED) |
|  | MOVWF | INDF | |
|  | MOVLW | 0x10 | |
|  | MOVWF | PORTA | ;START WITH IT OFF |
|  | INCF | FSR | ;POINT TO DDRB |
|  | MOVLW | 0x70 | ;ENABLE OFF |
|  | MOVWF | PORTB | ;MAKE SURE IT IS CLEAR |
|  | MOVLW | 0x00 | ;ONLY BITS 7 AND 6 ARE OUTPUTS XXX |
|  | MOVWF | INDF | |
|  | INCF | FSR | ;POINT TO ADCON1 |
|  | INCF | FSR | |
|  | MOVLW | 0x02 | ;AIN0 AND AIN1 ONLY |
|  | MOVWF | INDF | |
| ; | LAST OF RAM PAGE 1 ONLY REGISTERS | | |
|  | CLRF | FLG1 | |
| CUROFF | CLRF | LIMCNT | |
|  | CLRF | AVGCL | |
|  | CLRF | CRCNT | |
|  | CLRF | CRTOTL | |
|  | CLRF | CRTOTH | |
|  | CLRF | CRLCTL | |
|  | CLRF | CRLCTH | |
|  | CLRF | MAVGH | |
|  | CLRF | MAVGL | |

-continued

Attachment A

```
           BCF      FLG1,CCSTR
           MOVLW    ONEONV
           MOVWF    PCNTDW
           MOVLW    RFCVAL
           MOVWF    REFCNT
           MOVLW    DSVAL
           MOVWF    DSCNT
           MOVF     PCNTDW,W
           MOVWF    OFFCNT
           MOVLW    STDWDV
           MOVWF    WTHCNT
           MOVLW    0xFF
           MOVWF    RFFSTB
           MOVLW    0xA0        ;CLEAR FLAGS AND SET COUNT WAS 0xD0
           MOVWF    FLG2
           CLRF     CRLOK
SETHLM     MOVLW    REFHLM
           GOTO     SETRLM
SETLLM     MOVLW    REFLLM
SETRLM     MOVWF    REFVAL
           COMF     REFVAL
           RETURN
           END
```

What is claimed is:

1. A method for coping with unknown destabilizing external forces and dynamically stabilizing an object in the air based on the weight thereof under an electromagnetic source wherein a magnetic field produced by the electromagnetic source is controlled by adjusting an electric coil current flowing through a coil assembly in the electromagnetic source, the object having a permanent magnet embedded therein to react to the magnetic field, the method comprising the steps of:

sensing a position change of the object by a Hall effect sensor located close to the electromagnetic source; and continuously adjusting the position of the object by a microprocessor controlled circuit based on the sensed position change of the object until the coil current is in a predetermined range so that the object is stabilized based on the weight of the object.

2. The method of claim 1 wherein the object has a weight ranging from one to six pounds.

3. The method of claim 1 wherein the step of continuously adjusting produces a tactile feedback to a user who initially places the object underneath the electromagnetic source so that the object can be floated.

4. The method of claim 3 wherein the tactile feedback is created by controlling the coil current responsive to the user's placement.

5. The method of claim 1 further includes a step of turning off the electric current when a voltage value indicative of the sensed position change stays persistently beyond a predetermined range.

6. The method of claim 1 further includes a step of turning off the coil current when the coil current stays persistently beyond a predetermined range.

7. The method of claim 1 wherein the step of continuously adjusting further includes the steps of:

amplifying a voltage value obtained from the Hall effect sensor with an appropriate gain less than 50;

digitizing the amplified voltage in the microprocessor;

estimating a reference voltage value; and determining changes need to be made to the coil current based on the digitized voltage value and the reference voltage value.

8. The method of claim 7 further includes adjusting the voltage value of the Hall effect sensor to eliminate any interference due to a change of the coil current.

9. The method of claim 1 further includes providing a visual indication for an operation status of the system.

10. A method for stabilizing a floating object in a magnetic flotation system which tolerates minor external forces, the system comprising a sensor circuit for producing a sensor voltage reflecting the position change of the object, an electromagnetic source with a coil assembly for floating the object, a microprocessor for appropriately adjusting a coil current to maintain the position of the floating object with respect to a predetermined position range, the method comprising the steps of:

measuring the position change of the floating object periodically; and adjusting the coil current accordingly by the microprocessor to avoid a disruption of the system, wherein the magnetic flotation system floats an object between one and six pounds.

11. The method of claim 10 further includes a step of amplifying the sensor voltage by an amplifier circuit by a factor less than 50.

12. The method of claim 10 further includes a step of measuring the coil current periodically.

13. The method of claim 12 wherein the step of measuring includes the steps of:

obtaining an instant measurement of the coil current at the end of a first time interval; and obtaining a moving average of the coil current for a second time interval based on at least one instant measurement, the second time interval being longer than the first time interval.

14. The method of claim 10 wherein the step of adjusting the coil current by the microprocessor further includes the step of shutting the coil current down if the coil current is persistently beyond a predetermined range.

15. A control system for coping with unknown destabilizing external forces and floating an object under an electromagnetic source, whereas the strength of a magnetic field produced by the electromagnetic source can be controlled by adjusting an electric coil current flowing through a coil assembly in the electromagnetic source, the system comprising:

a single Hall effect sensor installed close to the electromagnetic source for sensing a position change of the object;

a microprocessor controlled circuit for modifying the coil current in the electromagnetic source based on the sensed position change for keeping the object floating, wherein the coil current is eventually kept in a predetermined operation range so that the floating object is stabilized based on the weight thereof.

16. The system of claim 15 wherein the object has a weight ranging from one to six pounds.

17. The system of claim 15 further includes a means for providing a tactile feedback to a user who positions the object underneath the electromagnetic source so that the object can be floated.

18. The system of claim 17 wherein the tactile feedback is created by controlling the coil current responsive to the user's positioning of the object.

19. The system of claim 15 wherein the microprocessor turns off the coil current when the floating object is removed from a predetermined position range.

20. The system of claim 15 wherein the microprocessor turns off the coil current when the coil current stays persistently beyond a predetermined range.

21. The system of claim 15 further including:

an amplifier circuit for amplifying a voltage obtained from the Hall effect sensor with an appropriate gain less than 50;

means for digitizing the amplified voltage in the microprocessor;

means for estimating a reference voltage value; and means for determining changes to be made to the coil current, responsive to the digitized voltage value and the reference value.

22. The system of claim 21 wherein the microprocessor adjusts the voltage value obtained from the Hall effect sensor to eliminate any interference due to a change of the coil current.

23. The system of claim 15 wherein the Hall effect sensor is located in a recess at the bottom of the electromagnetic source.

24. The system of claim 15 further includes a visual indication signaling an operation status of the system.

25. A control method for stabilizing a floating object in a magnetic flotation system which tolerates unknown external forces, the system comprising a sensor circuit for producing a sensor voltage reflecting the position change of the object, an electromagnetic source with a coil assembly for floating the object, a microprocessor for appropriately adjusting a coil current to maintain the position of the floating object with respect to a predetermined position range, the method comprising the steps of:

inducing a user to position the object close to a predetermined position range by creating an attracting or repelling force to the object;

sensing a position change of the object by a single Hall effect sensor while the user gradually releases the object underneath the electromagnetic source;

creating a tactile feedback to the user to indicate the predetermined position range to float the object;

continuously adjusting the coil current by the microprocessor based on the sensed position change of the object until the coil current is in a predetermined range; and adjusting the coil current by the microprocessor to avoid a disruption of the system due to interference of external forces.

26. The system of claim 25 further includes a step of providing a visual indication indicating an operation status of the system.

* * * * *